(12) United States Patent
Regele

(10) Patent No.: US 10,086,498 B2
(45) Date of Patent: Oct. 2, 2018

(54) COATED ABRASIVES HAVING A SUPERSIZE LAYER INCLUDING AN ACTIVE FILLER

(71) Applicants: SAINT-GOBAIN ABRASIVES, INC., Worcester, MA (US); SAINT-GOBAIN ABRASIFS, Conflans-Sainte-Honorine (FR)

(72) Inventor: Julienne C. Regele, Worcester, MA (US)

(73) Assignees: SAINT-GOBAIN ABRASIVES, INC., Worcester, MA (US); SAINT-GOBAIN ABRASIFS, Conflans-Sainte-Honorine (FR)

(*) Notice: Subject to any disclaimer, the term of this patent is extended or adjusted under 35 U.S.C. 154(b) by 0 days.

(21) Appl. No.: 14/977,885

(22) Filed: Dec. 22, 2015

(65) Prior Publication Data

US 2016/0184970 A1 Jun. 30, 2016

Related U.S. Application Data

(60) Provisional application No. 62/099,005, filed on Dec. 31, 2014.

(51) Int. Cl.
*C09K 3/14* (2006.01)
*B24D 3/28* (2006.01)
*B24D 3/00* (2006.01)

(52) U.S. Cl.
CPC .............. *B24D 3/28* (2013.01); *B24D 3/004* (2013.01); *C09K 3/1436* (2013.01)

(58) Field of Classification Search
None
See application file for complete search history.

(56) References Cited

U.S. PATENT DOCUMENTS

| 5,306,319 | A | * | 4/1994 | Krishnan | B24D 3/28 51/298 |
| 5,342,419 | A | * | 8/1994 | Hibbard | B24D 3/28 51/298 |
| 5,352,254 | A | | 10/1994 | Celikkaya | |
| 5,417,726 | A | | 5/1995 | Stout et al. | |
| 5,492,550 | A | * | 2/1996 | Krishnan | B24D 3/28 51/298 |
| 5,505,747 | A | | 4/1996 | Chesley et al. | |

(Continued)

FOREIGN PATENT DOCUMENTS

| EP | 1497079 B1 | 5/2008 |
| EP | 2250030 B1 | 4/2014 |

OTHER PUBLICATIONS

Atashin, Sanam; Bahrololoom, Mohammad Ebrahim; Toloei, Alisina. "A New Approach in Modifying Polymeric Coatings to Increase Corrosion Resistance Properties" Mar. 5, 2013) ISRN Materials Science, vol. 2013, 7 pages.*

(Continued)

*Primary Examiner* — Colleen P Dunn
*Assistant Examiner* — Ross J Christie
(74) *Attorney, Agent, or Firm* — Abel Law Group, LLP; Joseph P Sullivan

(57) ABSTRACT

The present invention relates generally to coated abrasive articles that include active filler particles in a supersize coat, a make coat, or combinations thereof, as well as methods of making and using said coated abrasive articles.

10 Claims, 6 Drawing Sheets

(56) References Cited

U.S. PATENT DOCUMENTS

| | | | |
|---|---|---|---|
| 5,556,437 A | 9/1996 | Lee et al. | |
| 5,565,011 A | 10/1996 | Follett et al. | |
| 5,573,619 A | 11/1996 | Benedict et al. | |
| 5,690,539 A * | 11/1997 | Swidler | B24C 11/005 |
| | | | 451/38 |
| 6,359,027 B1 | 3/2002 | Dahlke et al. | |
| 7,094,817 B2 | 8/2006 | Halley et al. | |
| 7,413,633 B2 | 8/2008 | Li et al. | |
| 7,736,468 B2 | 6/2010 | Li et al. | |
| 8,491,681 B2 | 7/2013 | Chuda et al. | |
| 8,609,750 B1 | 12/2013 | Miller | |
| 2002/0198121 A1 | 12/2002 | Nitzsche | |
| 2005/0239381 A1* | 10/2005 | Mesa | B24B 29/00 |
| | | | 451/54 |
| 2009/0298993 A1 | 12/2009 | Kosinski et al. | |
| 2011/0033695 A1 | 2/2011 | Kim et al. | |
| 2012/0259066 A1 | 10/2012 | Bleyen et al. | |

OTHER PUBLICATIONS

BYK Additives & Instruments. Material Safety Data Sheet for Cloisite 30B. Issued Oct. 2013.*
Alumina Trihydrate, Akrochem Corporation, Akron, 1 pg.
Cloisite 30B, BYK Additives & Instruments, Germany, Oct. 2013, 1 page.
Metallic Materials, TEADIT, Pasadena, 2008, 2 pages.

\* cited by examiner

COATED ABRASIVES HAVING A SUPERSIZE LAYER INCLUDING AN ACTIVE FILLER

CROSS-REFERENCE TO RELATED APPLICATION

This application claims priority under 35 U.S.C. § 119(e) to U.S. Provisional Application No. 62/099,005, entitled "COATED ABRASIVES HAVING A SUPERSIZE LAYER INCLUDING AN ACTIVE FILLER", by Julienne C. Labrecque, filed Dec. 31, 2014, which is assigned to the current assignee hereof and incorporated herein by reference in its entirety.

FIELD OF THE INVENTION

The present invention relates generally to coated abrasive articles that include active filler particles in a supersize coat, a make coat, or combinations thereof, as well as methods of making and using said coated abrasive articles.

BACKGROUND

Abrasive articles, such as coated abrasives, are used in various industries to machine work pieces, such as by lapping, grinding, and polishing. Surface processing using abrasive articles spans a wide industrial scope from initial coarse material removal to high precision finishing and polishing of surfaces at a submicron level. Effective and efficient abrasion of metal surfaces, particularly iron-carbon alloys, such as carbon steel and stainless steel, and nickel-chromium alloys, such as Inconel, which are required for high performance oxidation resistant and corrosion resistant applications, pose numerous processing challenges.

Industries that produce or rely on such alloys are sensitive to factors that influence operational costs, including the speed at which a surface can be prepared, the cost of the materials used to prepare that surface, and the costs associated with the time expended to prepare a surface. Typically, industry seeks to achieve cost effective abrasive materials and processes that achieve high material removal rates. However, abrasives and abrasive processes that exhibit high removal rates often also tend to exhibit poor performance, if not impossibility, in achieving desired surface characteristics associated with high precision finishing and polishing of surfaces. Conversely, abrasives that produce such desirable surface characteristics often have low material removal rates, which can require more time and effort to remove a sufficient amount of surface material.

Therefore, there continues to be a demand for improved abrasive products and methods that can offer enhanced abrasive processing performance, efficiency, and improved surface quality.

BRIEF DESCRIPTION OF THE DRAWINGS

The present disclosure can be better understood, and its numerous features and advantages made apparent to those skilled in the art by referencing the accompanying drawings.

The use of the same reference symbols in different drawings indicates similar or identical items.

DETAILED DESCRIPTION

Figure 1:
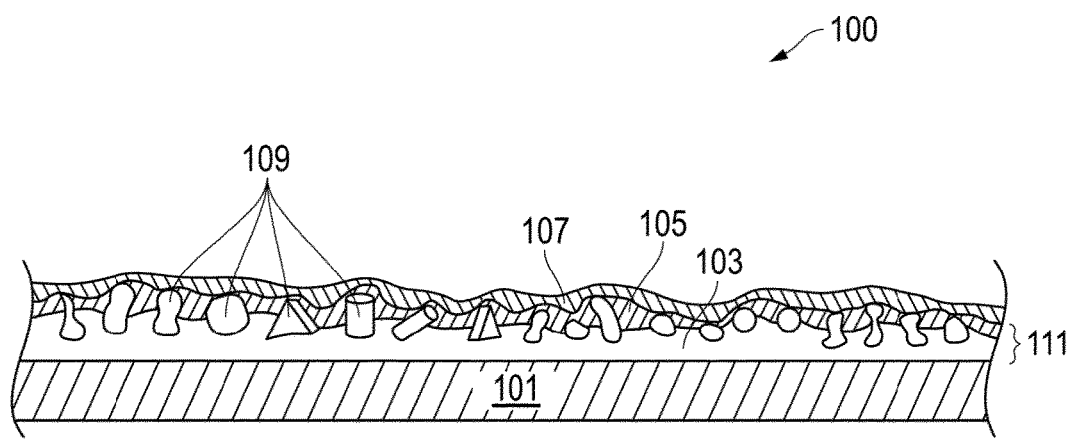
FIG. 1 is an illustration of a cross sectional view of an embodiment of a coated abrasive article that includes active fillers in a supersize coat.

The following description, in combination with the figures, is provided to assist in understanding the teachings disclosed herein. The following discussion will focus on specific implementations and embodiments of the teachings. This discussion is provided to assist in describing the teachings and should not be interpreted as a limitation on the scope or applicability of the teachings.

The term "averaged," when referring to a value, is intended to mean an average, a geometric mean, or a median value. As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but can include other features not expressly listed or inherent to such process, method, article, or apparatus. As used herein, the phrase "consists essentially of" or "consisting essentially of" means that the subject that the phrase describes does not include any other components that substantially affect the property of the subject.

Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Further, references to values stated in ranges include each and every value within that range. When the terms "about" or "approximately" precede a numerical value, such as when describing a numerical range, it is intended that the exact numerical value is also included. For example, a numerical range beginning at "about 25" is intended to also include a range that begins at exactly 25. Moreover, it will be appreciated that references to values stated as "at least about," "greater than," "less than," or "not greater than" can include a range of any minimum or maximum value noted therein.

As used herein, the phrase "average particle diameter" can be reference to an average, mean, or median particle diameter, also commonly referred to in the art as D50.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and can be found in textbooks and other sources within the coated abrasive arts.

FIG. 1 shows an illustration of a cross section of a coated abrasive article 100 embodiment. An abrasive layer 111, which comprises abrasive particles 109 dispersed on or in a polymeric binder layer 103, is disposed on backing material 101. A size coat layer 105 is disposed on the abrasive layer. A supersize layer 107 is disposed on the size coat layer.

Figure 2:
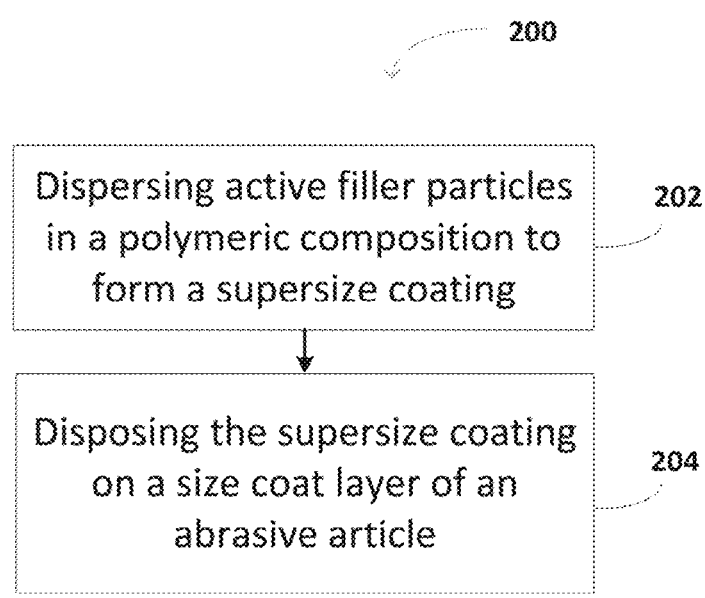
FIG. 2 is an illustration of a flow chart of an embodiment of a method of making a coated abrasive article that includes active fillers in a supersize coat.

FIG. 2 is an illustration of a flowchart of an embodiment of a method 200 of making a coated abrasive article containing active filler particles in a supersize coat. Step 202 includes dispersing active filler particles in a polymeric composition to form a supersize coating. Step 204 includes disposing the supersize coating on a size coat layer of an abrasive article.

Figure 3:
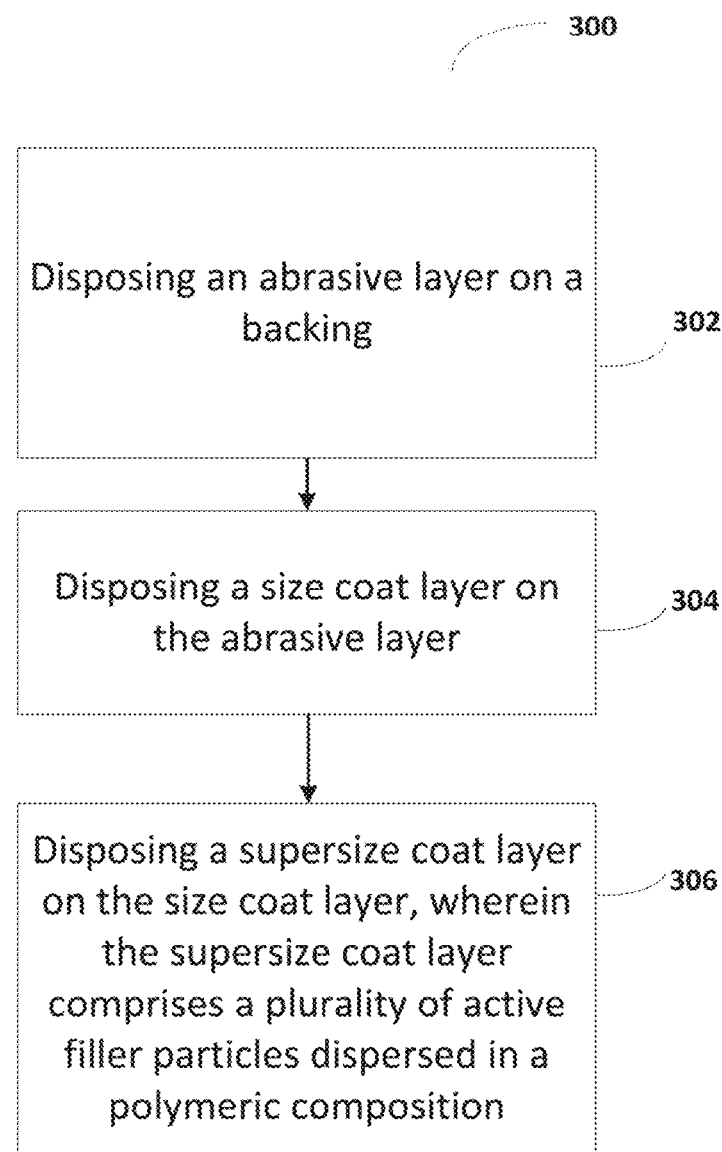
FIG. 3 is an illustration of a flow chart of an embodiment of a method of making a coated abrasive article that includes active fillers in a supersize coat.

FIG. 3 is an illustration of a flowchart of an embodiment of a method 300 of making a coated abrasive article containing active filler particles in a supersize coat. Step 302 includes disposing an abrasive layer on a backing material. Step 304 includes disposing a size coat layer of the abrasive layer. Step 306 includes disposing a supersize coat layer on the size coat layer, wherein the supersize coat layer comprises a plurality of active filler particles dispersed in a polymeric composition.

Active Filler

It has been surprisingly discovered that the presence of active filler particles in the supersize coat of a coated abrasive article provides unexpected and beneficial abrasive performance. Further, it has also been surprisingly discovered that the presence of active filler particles in both the make coat and in the supersize coat of a coated abrasive article provides unexpected and beneficial abrasive performance.

Active filler particles can be modified clay particles, para-aramid particles, metal hydrate particles, or a combination thereof. In an embodiment, modified clay particles can be organically modified clay particles. In an embodiment, modified clay particles can comprise modified montmorillonite clay particles, such as quaternary ammonium salt modified montmorillonite clay, also known as alkyl quaternary ammonium bentonite, which is available under the trade name Cloisite 30B. Cloisite 30B is derived from layered magnesium aluminum silicate (montmorillonite), which is organically modified by a cation exchange reaction. Specifically, the commercially available clay, Cloisite 30B, is modified with methyl, tallow (~65% C18; ~30% C16; ~5% C14), bis-2-hydroxyethyl, quaternary ammonium chloride; and is believed to have a d-spacing of 1.85 nm. The chemical structure of the Cloisite 30B modifier is:

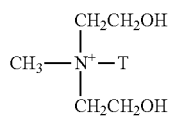

Where T is Tallow (~65% C18, ~30% C16, and ~5% C14). In an embodiment, the active filler particle is a quaternary ammonium salt modified montmorillonite clay (i.e., Cloisite 30B).

The active filler particles can be para-aramid particles. In an embodiment, para-aramid particles can be p-phenylene terephthalamide particles, which are available under the trade name Twaron. In an embodiment, the para-aramid particles are less than a particular, such as less than 300 microns, less than 275 microns, less than 250 microns. In a specific embodiment, at least 99% of the para-aramid particles are not greater than 250 microns in size.

The active filler particles can be metal hydroxide particles. In an embodiment, the metal hydroxide particles can comprise metal hydrate particles. In an embodiment, metal hydroxide can comprise alumina trihydrate particles.

The active filler particles can be present in one or more particular layers of the coated abrasive article. The active filler particles present in one layer can be same as or different than the active filler particles present in another layer. In an embodiment, the active filler particles are present in a supersize coat; a make coat, or both the supersize coat and the make coat. In a specific embodiment, active filler particles are dispersed in the supersize coat. In another specific embodiment, active filler particles are dispersed in the make coat. In another specific embodiment, active filler particles are dispersed in the supersize coat and the make coat. In another specific embodiment, active filler particles are dispersed only in the supersize coat. In another specific embodiment, active filler particles are dispersed only in the supersize coat and the make coat. In a particular embodiment, the active filler articles dispersed in the supersize coat are quaternary ammonium salt modified montmorillonite clay particles, p-phenylene terephthalamide particles, or aluminum trihydrate particles, or a combination thereof. In another particular embodiment, the active filler articles dispersed in the make coat are aluminum trihydrate particles. In another particular embodiment, the active filler articles dispersed in the supersize coat are quaternary ammonium salt modified montmorillonite clay particles, p-phenylene terephthalamide particles, aluminum trihydrate particles, or a combination thereof and the only active filler articles dispersed in the make coat are aluminum trihydrate particles.

The amount of active filler particles in the supersize coat layer can vary. In an embodiment, the amount of active filler in the supersize coat layer can be not less than 0.1 wt %, such as not less than 0.3 wt %, not less than 0.5 wt %, not less than 1 wt %, not less than 2 wt %, not less than 3 wt %, not less than 4 wt %, not less than 5 wt %, or not less than 6 wt %. In another embodiment, the amount of active filler particles in the supersize coat can be not greater than 15 wt %, such as not greater than 14 wt %, not greater than 13 wt %, not greater than 12 wt %, not greater than 11 wt %, not greater than 10 wt %, not greater than 9 wt %, or not greater than 8 wt %. The amount of weight of the active filler particles can be within a range comprising any pair of the previous upper and lower limits. In a particular embodiment, the amount of weight of the active filler particles can be in the range of not less than 0.1 wt % to not greater than 15 wt %, such as not less than 0.5 wt % to not greater than 15 wt % GSM, not less than 1 wt % to not greater than 14 wt %.

The amount of active filler particles in the make coat can vary. In an embodiment, the amount of active filler in the make coat can be not less than 0.1 wt %, such as not less than 0.3 wt %, not less than 0.5 wt %, not less than 1 wt %, not less than 2 wt %, not less than 3 wt %, not less than 4 wt %, not less than 5 wt %, or not less than 6 wt %. In another embodiment, the amount of active filler particles in the make coat can be not greater than 15 wt %, such as not greater than 14 wt %, not greater than 13 wt %, not greater than 12 wt %, not greater than 11 wt %, not greater than 10 wt %, not greater than 9 wt %, or not greater than 8 wt %. The amount of weight of the active filler particles can be within a range comprising any pair of the previous upper and lower limits.

In a particular embodiment, the amount of weight of the active filler particles can be in the range of not less than 0.1 wt % to not greater than 15 wt %, such as not less than 0.5 wt % to not greater than 15 wt % GSM, not less than 1 wt % to not greater than 14 wt %.

In a particular embodiment, the active filler particles are alumina trihydrate, organically modified clay, or para-aramid particles, and are present in the supersize coat in an amount of not less than 0.5 wt % and not greater than 14 wt %. In another particular embodiment, the active filler particles are alumina trihydrate, organically modified clay, or para-aramid particles, and are present in the supersize coat in an amount of not less than 0.5 wt % and not greater than 14 wt % and alumina trihydrate is present in the make coat in an amount not less than 0.5 wt % to not greater than 14 wt %.

Backing Material

The backing material (also referred to herein as "a backing") can be flexible or rigid. The backing can be made of any number of various materials including those conventionally used as backings in the manufacture of coated abrasives. An exemplary flexible backing includes a polymeric film (for example, a primed film), such as polyolefin film (e.g., polypropylene including biaxially oriented polypropylene), polyester film (e.g., polyethylene terephthalate), polyamide film, or cellulose ester film; metal foil; mesh; foam (e.g., natural sponge material or polyurethane foam); cloth (e.g., cloth made from fibers or yarns comprising polyester, nylon, silk, cotton, poly-cotton, rayon, or combinations thereof); paper; vulcanized paper; vulcanized rubber; vulcanized fiber; nonwoven materials; a combination thereof; or a treated version thereof. Cloth backings can be woven or stitch bonded. In particular examples, the backing is selected from the group consisting of paper, polymer film, cloth (e.g., cotton, poly-cotton, rayon, polyester, poly-nylon), vulcanized rubber, vulcanized fiber, metal foil and a combination thereof. In other examples, the backing includes polypropylene film or polyethylene terephthalate (PET) film.

The backing can optionally have at least one of a saturant, a presize layer (also called a "front fill layer"), or a backsize layer (also called a "back fill layer"). The purpose of these layers is typically to seal the backing or to protect yarn or fibers in the backing. If the backing is a cloth material, at least one of these layers is typically used. The addition of the presize layer or backsize layer can additionally result in a "smoother" surface on either the front or the back side of the backing. Other optional layers known in the art can also be used such as a tie layer.

The backing can be a fibrous reinforced thermoplastic such as described, for example, in U.S. Pat. No. 5,417,726 (Stout et al.), or an endless spliceless belt, as described, for example, in U.S. Pat. No. 5,573,619 (Benedict et al.). Likewise, the backing can be a polymeric substrate having hooking stems projecting therefrom such as that described, for example, in U.S. Pat. No. 5,505,747 (Chesley et al.). Similarly, the backing can be a loop fabric such as that described, for example, in U.S. Pat. No. 5,565,011 (Follett et al.).

Abrasive Layer

The abrasive layer comprises a plurality of abrasive particles disposed on, or dispersed in, a polymeric binder composition. In an embodiment, an abrasive layer 111 includes abrasive particles 109 disposed on, or dispersed in, binder composition 103.

Abrasive Particles

Abrasive particles can include essentially single phase inorganic materials, such as alumina, silicon carbide, silica, ceria, and harder, high performance superabrasive particles such as cubic boron nitride and diamond. Additionally, the abrasive particles can include composite particulate materials. Such materials can include aggregates, which can be formed through slurry processing pathways that include removal of the liquid carrier through volatilization or evaporation, leaving behind unfired ("green") aggregates, that can optionally undergo high temperature treatment (i.e., firing, sintering) to form usable, fired aggregates. Further, the abrasive regions can include engineered abrasives including macrostructures and particular three-dimensional structures.

In an embodiment, the abrasive particles are blended with the binder formulation to form abrasive slurry. Alternatively, the abrasive particles are applied over the binder formulation after the binder formulation is coated on the backing. Optionally, a functional powder can be applied over the abrasive regions to prevent the abrasive regions from sticking to a patterning tooling. Alternatively, patterns can be formed in the abrasive regions absent the functional powder.

The abrasive particles can be formed of any one of or a combination of abrasive particles, including silica, alumina (fused or sintered), zirconia, zirconia/alumina oxides, silicon carbide, garnet, diamond, cubic boron nitride, silicon nitride, ceria, titanium dioxide, titanium diboride, boron carbide, tin oxide, tungsten carbide, titanium carbide, iron oxide, chromia, flint, emery. For example, the abrasive particles can be selected from a group consisting of silica, alumina, zirconia, silicon carbide, silicon nitride, boron nitride, garnet, diamond, co-fused alumina zirconia, ceria, titanium diboride, boron carbide, flint, emery, alumina nitride, and a blend thereof. Particular embodiments have been created by use of dense abrasive particles comprised principally of alpha-alumina.

The abrasive grain can also have a particular shape. An example of such a shape includes a rod, a triangle, a pyramid, a cone, a solid sphere, a hollow sphere, or the like. Alternatively, the abrasive grain can be randomly shaped.

In an embodiment, the abrasive particles can have an average particle size not greater than 2000 microns, such as not greater than about 1500 microns, not greater than about 1000 microns, not greater than about 750 microns, or not greater than 500 microns. In another embodiment, the abrasive particle size is at least 0.1 microns, at least 1 microns, at least 5 microns, at least 10 microns, at least 25 microns, or at least 45 microns. In another embodiment, the abrasive particles size is from about 0.1 microns to about 2000 microns. The particle size of the abrasive particles is typically specified to be the longest dimension of the abrasive particle. Generally, there is a range distribution of particle sizes. In some instances, the particle size distribution is tightly controlled.

Make Coat—Binder Composition

The binder composition (commonly known as the make coat) can be formed of a single polymer or a blend of polymers. The binder composition can be formed from an epoxy composition, acrylic composition, a phenolic composition, a polyurethane composition, a phenolic composition, a polysiloxane composition, or combinations thereof. In addition, the binder composition can include active filler particles, as described above, additives, or a combination thereof.

The binder composition generally includes a polymer matrix, which binds abrasive particles to the backing or to a compliant coat, if such a compliant coat is present. Typically, the binder composition is formed of cured binder formulation. In an embodiment, the binder formulation includes a polymer component and a dispersed phase.

The binder formulation can include one or more reaction constituents or polymer constituents for the preparation of a polymer. A polymer constituent can include a monomeric molecule, a polymeric molecule, or a combination thereof. The binder formulation can further comprise components selected from the group consisting of solvents, plasticizers, chain transfer agents, catalysts, stabilizers, dispersants, curing agents, reaction mediators and agents for influencing the fluidity of the dispersion.

The polymer constituents can form thermoplastics or thermosets. By way of example, the polymer constituents can include monomers and resins for the formation of polyurethane, polyurea, polymerized epoxy, polyester, polyimide, polysiloxanes (silicones), polymerized alkyd, styrene-butadiene rubber, acrylonitrile-butadiene rubber, polybutadiene, or, in general, reactive resins for the production of thermoset polymers. Another example includes an acrylate or a methacrylate polymer constituent. The precursor polymer constituents are typically curable organic material (i.e., a polymer monomer or material capable of polymerizing or crosslinking upon exposure to heat or other sources of energy, such as electron beam, ultraviolet light, visible light, etc., or with time upon the addition of a chemical catalyst, moisture, or other agent which cause the polymer to cure or polymerize). A precursor polymer constituent example includes a reactive constituent for the formation of an amino polymer or an aminoplast polymer, such as alkylated urea-formaldehyde polymer, melamine-formaldehyde polymer, and alkylated benzoguanamine-formaldehyde polymer; acrylate polymer including acrylate and methacrylate polymer, alkyl acrylate, acrylated epoxy, acrylated urethane, acrylated polyester, acrylated polyether, vinyl ether, acrylated oil, or acrylated silicone; alkyd polymer such as urethane alkyd polymer; polyester polymer; reactive urethane polymer; phenolic polymer such as resole and novolac polymer; phenolic/latex polymer; epoxy polymer such as bisphenol epoxy polymer; isocyanate; isocyanurate; polysiloxane polymer including alkylalkoxysilane polymer; or reactive vinyl polymer. The binder formulation can include a monomer, an oligomer, a polymer, or a combination thereof. In a particular embodiment, the binder formulation includes monomers of at least two types of polymers that when cured can crosslink. For example, the binder formulation can include epoxy constituents and acrylic constituents that when cured form an epoxy/acrylic polymer.

In an embodiment, the make coat comprises no active filler particles. In an embodiment, the make coat comprises a phenolic composition and no active filler particles. In another embodiment, the make coat comprises active filler particles. In a specific embodiment, the make coat comprises a phenolic composition and active filler particles. In another specific embodiment, the make coat comprises a phenolic composition, active filler particles, and an additive. In a particular embodiment, the make coat comprises about 30 to 50 wt % of a phenolic composition, about 5 wt % to 15 wt % of active filler particles, and about 35 wt % to 45 wt % of wollastonite.

Size Coat

The coated abrasive article can comprise a size coat disposed on the abrasive layer. The size coat can be the same as or different from the polymer binder composition used to form the size coat of the abrasive layer. The size coat can comprise any conventional compositions known in the art that can be used as a size coat. The size coat can include one or more additives.

In a specific embodiment, the size coat comprises no active filler particles. In another embodiment, the size coat comprises a phenolic composition. In another embodiment, the size coat comprises a phenolic composition and an additive. In a specific embodiment, the size coat comprises about 30 to 65 wt % of a phenolic composition and about 35 wt % to 55 wt % of cryolite.

Supersize Coat

The coated abrasive article can comprise a supersize coat disposed on the size coat. The supersize coat can be the same as or different from the polymer binder composition of the binder composition of the make coat. The supersize coat composition includes active filler particles, as described above. The supersize coat can include one or more additives in addition to the active filler particles.

In an embodiment, the supersize coat comprises a phenolic composition and active filler particles. In a specific embodiment, the supersize coat comprises a phenolic composition, active filler particles, and an additive. In another specific embodiment, the supersize coat comprises a phenolic composition, active filler particles, and potassium fluoroborate. In a particular embodiment, the supersize coat comprises about 15 wt % to 40 wt % of a phenolic composition, about 5 wt % to 15 wt % of active filler particles, and about 45 wt % to 65 wt % of potassium fluoroborate.

Additives

The make coat, size coat, or supersize coat can include one or more additives.

Suitable additives can include grinding aids, fibers, lubricants, wetting agents, thixotropic materials, surfactants, thickening agents, pigments, dyes, antistatic agents, coupling agents, plasticizers, suspending agents, pH modifiers, adhesion promoters, lubricants, bactericides, fungicides, flame retardants, degassing agents, anti-dusting agents, dual function materials, initiators, chain transfer agents, stabilizers, dispersants, reaction mediators, colorants, and defoamers. The amounts of these additive materials can be selected to provide the properties desired. These optional additives can be present in any part of the overall system of the coated abrasive product according to embodiments of the present disclosure. Suitable grinding aids can be inorganic based; such as halide salts, for example cryolite, wollastonite, and potassium fluoroborate; or organic based, such as sodium lauryl sulphate, or chlorinated waxes, such as polyvinyl chloride. In an embodiment, the grinding aid can be an environmentally sustainable material.

Embodiment 1

Coated abrasive article comprising: a backing material; an abrasive layer disposed on the backing material, wherein the abrasive layer comprises abrasive particles disposed on or in a binder composition; a size coat layer disposed on the abrasive layer; and a supersize coat layer disposed on the size coat layer, wherein the supersize coat layer comprises a polymeric composition, and a plurality of active filler particles dispersed in the polymeric composition.

Embodiment 2

The coated abrasive article of embodiment 1, wherein the active filler particles are modified clay particles, para-aramid particles, metal hydrate particles, or a combination thereof.

Embodiment 3

The coated abrasive article of embodiment 2, wherein the modified clay particles comprise organically modified clay particles.

Embodiment 4

The coated abrasive article of embodiment 3, wherein the organically modified clay particles are organically modified montmorillonite clay particles.

Embodiment 5

The coated abrasive article of embodiment 4, wherein the organically modified clay particles are quaternary ammonium salt modified montmorillonite clay particles.

Embodiment 6

The coated abrasive article of embodiment 2, wherein the para-aramid particles are p-phenylene terephthalamide particles.

Embodiment 7

The coated abrasive article of embodiment 2, wherein the para-aramid particles have an average particle size less than 300 microns.

Embodiment 8

The coated abrasive article of embodiment 1, wherein the active filler particles are present in an amount based on the weight of the supersize coat layer of not less than 0.1 weight percent, such as not less than 0.5 weight percent, not less than 1 weight percent, not less than 2 weight percent, not less than 3 weight percent, not less than 4 weight percent, not less than 5 weight percent, or not less than 6 weight percent.

Embodiment 9

The coated abrasive article of embodiment 1, wherein the active filler particles are present in an amount based on the weight of the supersize coat layer of not greater than 15 weight percent, such as not greater than 14 weight percent, not greater than 13 weight percent, not greater than 12 weight percent, not greater than 11 weight percent, not greater than 10 weight percent, not greater than 9 weight percent, or not greater than 8 weight percent.

Embodiment 10

The abrasive article of embodiment 5, wherein the supersize coat layer comprises organically modified clay particles in an amount ranging from 3 wt % to 14 wt %, such as 4 wt % to 12 wt %, or 5 wt % to 10 wt %.

Embodiment 11

The abrasive article of embodiment 10, wherein the organically modified clay particles have an average particle size of not greater than 50 microns and not less than 1 micron.

Embodiment 12

The abrasive article of embodiment 7, wherein the supersize coat layer comprises para-aramid particles in an amount ranging from 3 wt % to 14 wt %, such as 4 wt % to 12 wt %, or 5 wt % to 10 wt %.

Embodiment 13

The abrasive article of embodiment 12, wherein the para-aramid particles are present in the form of a powder having an average particle size less than 250µ.

Embodiment 14

The abrasive article of embodiment 1, further comprising a plurality of active filler particles dispersed in the binder composition of the abrasive layer.

Embodiment 15

The abrasive article of embodiment 14 wherein the active filler particles comprise metal hydrate particles.

Embodiment 16

The abrasive article of embodiment 15, wherein the metal hydrate particles comprise alumina trihydrate particles.

Embodiment 17

The abrasive article of embodiment 16, wherein the aluminum trihydrate is present in amount not greater than 15 weight %, such is not greater than 14 wt %, not greater than 13 wt %, not greater than 12 wt %, not greater than 11 wt %, not greater than 10 wt %, not greater than 8 week percent, not greater than 7 wt %.

Embodiment 18

Coated abrasive article of embodiment 17, wherein the aluminum trihydrate is not present in amount not less than 0.1 wt %, such as not less than 1 wt %, not less to wt %, not less than 3 wt %, not less than 4 wt %, not less than 5 wt %, or not less than 6 wt %.

Embodiment 19

The abrasive article of embodiment 1, wherein the abrasive article has an increased carbon steel removal rating of at least 5%, at least 7%, at least 9%, at least 10, at least 12%, at least 15%, at least 18%, at least 20% compared to an identical coated abrasive with the only difference being that a plurality of active filler particles are present in the supersize coat.

Embodiment 20

The abrasive article of embodiment 1, wherein the abrasive article has an increased cumulative stainless steel material removal rating of at least 5%, at least 10%, at least 15%, at least 20, at least 25%, at least 30%, at least 35%, or at least 40% compared to an identical coated abrasive with the only difference being that a plurality of active filler particles are present in the supersize coat.

Embodiment 21

The abrasive article of embodiment 1, wherein the abrasive article has an increased cumulative Inconel material removal rating of at least 5%, at least 10%, or at least 15% compared to an identical coated abrasive with the only difference being that a plurality of active filler particles are present in the supersize coat.

Embodiment 22

The abrasive article of embodiment 1, wherein the active filler particles of the supersize coat consist essentially of organically modified clay particles, or essentially of para-aramid particles.

Embodiment 23

A method of making a coated abrasive article comprising: dispersing active filler particles in a supersize polymeric composition to form an enhanced supersize coating; disposing the enhanced supersize coating on a size coat layer of the coated abrasive article.

Embodiment 24

The method of embodiment 23, wherein the active filler particles are para-aramid particles, modified clay particles, or a combination thereof.

Embodiment 25

A method of making a coated abrasive article comprising: disposing an abrasive layer on a backing; disposing a size coat layer on the abrasive layer; disposing a supersize coat layer on the size coat layer, wherein the size coat layer comprises a plurality of active filler particles dispersed in a polymeric composition.

Embodiment 26

The method of embodiment 25, wherein the active filler particles are para-aramid particles, modified clay particles, metal hydrate particles or a combination thereof.

Embodiment 27

The method of embodiment 26, wherein the abrasive layer comprises abrasive particles and active filler particles dispersed in the binder composition.

Embodiment 28

The method of embodiment 27, wherein the active filler particles comprise 0.5 wt % to 20 wt % of the size coat layer.

Embodiment 29

The method of embodiment 28, wherein active filler particles comprises 0.5 wt % to 20 wt % of the binder composition of the abrasive layer.

Embodiment 30

A method of abrading a substrate comprising: abrading a carbon steel substrate, a stainless steel substrate, an Inconel substrate, or a combination thereof, using the abrasive article of embodiment 1.

EXAMPLES

Example 1: Abrasive Belt with Active Particles in Supersize

Coated abrasive belts were prepared according to the following details.
Backing: Polyester cloth;
Abrasive particles: High performance Aluminum oxide, 36 grit (Hipal brand aluminum oxide particles, Saint-Gobain Abrasives)
Make coat: Control formulation shown in Table 1;
Size coat: Control formulation shown in Table 2; and
Supersize coat: formulations shown in Table 3.

TABLE 1

Make Coat Formulation - Control

| Components | C1 (wt %) |
|---|---|
| Phenolic Resin | 52.8 |
| Defoamer | 0.1 |
| Surfactant | 0.1 |
| Wollastonite | 42.2 |
| Water | 4.8 |

TABLE 2

Size Coat Formulation - Control

| Components | C1 (wt %) |
|---|---|
| Phenolic Resin | 46.9 |
| Thiocure | 4.7 |
| Defoamer | 0.1 |
| Surfactant | 0.2 |
| Dispersant | 0.8 |
| Liquid Plastic Colorant | 2.3 |
| Cryolite ($Na_3AlF_6$) | 41.3 |
| Water | 3.5 |

TABLE 3

Supersize Formulations

| Component | C1 (wt %) | C2 (wt %) | S1 (wt %) | S2 (wt %) | S3 (wt %) | S4 (wt %) | S5 (wt %) |
|---|---|---|---|---|---|---|---|
| PF Resin[1] | 23.0 | 23.0 | 23.0 | 23.0 | 23.0 | 23.0 | 23.0 |
| Defoamer | 0.1 | 0.1 | 0.1 | 0.1 | 0.1 | 0.1 | 0.1 |
| Dispersant[2] | 1.7 | 1.7 | 1.7 | 1.7 | 1.7 | 1.7 | 1.7 |
| Liquid Plastic Colorant | 2.8 | 2.8 | 2.8 | 2.8 | 2.8 | 2.8 | 2.8 |
| Fumed Silica Powder[3] | 0.2 | 0.2 | 0.2 | 0.2 | 0.2 | 0.2 | 0.2 |
| Potassium Fluoroborate ($KBF_4$) | 64.5 | 57.5 | 57.5 | 57.5 | 57.5 | 49.5 | 49.5 |
| Zinc Borate ($Zn_3BO_6$) | — | 7.0 | — | — | — | — | — |
| Aluminum Trihydrate ($Al_2O_3 \cdot 3H_2O$) | — | — | 7.0 | — | — | 15 | — |

TABLE 3-continued

| | Supersize Formulations | | | | | | |
|---|---|---|---|---|---|---|---|
| Component | C1 (wt %) | C2 (wt %) | S1 (wt %) | S2 (wt %) | S3 (wt %) | S4 (wt %) | S5 (wt %) |
| Organically Modified Clay[4] | — | — | — | 7.0 | — | — | — |
| Imide Powder[5] | — | — | — | — | 7.0 | — | 15 |
| Water | 7.7 | 7.7 | 7.7 | 7.7 | 7.7 | 7.7 | 7.7 |

[1]Prefere 80 5080A
[2]Daxad 11
[3]Cab-o-sil M5
[4]Cloisite 30B
[5]Twaron poly 5011 powder It was observed that supersize compositions C2 and S5 were not usable as supersize coatings. Composition C2, which contained 7 wt % zinc borate was very thick, having the consistency of cottage cheese, and would not properly adhere to the size coating. Similarly, composition S5, which contained 15 wt % imide powder, was also very thick, having the consistency of cottage cheese, and would not properly adhere to the size coating.

The other supersize compositions C1 and S1-S4 were successfully used to construct coated abrasive belts.

Example 2: Abrasive Belts with Active Particles in Make Coat

Coated abrasive belts were prepared according to the following details.
Backing: same as Example 1;
Abrasive particles: same as Example 1;
Make coat: formulations shown in Table 4;
Size coat: control formulation shown in Table 2; and
Supersize coat: control formulation shown in Table 3.

TABLE 4

| | Make Coat Formulations - Cloisite/Twaron 7% in Make Coat | | | |
|---|---|---|---|---|
| Components | C1 (wt %) | S6 | S7 | S8 |
| Phenolic Resin | 52.8 | 52.8 | 52.8 | 52.8 |
| Defoamer | 0.1 | 0.1 | 0.1 | 0.1 |
| Surfactant | 0.1 | 0.1 | 0.1 | 0.1 |
| Wollastonite | 42.2 | 35.2 | 35.2 | 35.2 |
| Organically Modified Clay | — | 1.75 | 3.5 | 5.25 |
| Imide Powder | — | 5.25 | 3.5 | 1.75 |
| Water | 4.8 | 4.8 | 4.8 | 4.8 |

The compositions C1 and S6-S8 were successfully used to construct coated abrasive belts.

Example 3: Abrasive Belts with Active Particles in Make Coat and Size Coat

Coated abrasive belts were prepared according to the following details.
Backing: same as Example 1;
Abrasive particles: same as Example 1;
Make coat: formulations shown in Table 5;
Size coat: control formulation shown in Table 2; and
Supersize coat: formulations shown in Table 6.

TABLE 5

| | Make Coat Formulation -7 wt % Aluminum Trihydrate | | | |
|---|---|---|---|---|
| Components | C1 (wt %) | S9 | S10 | S11 |
| Phenolic Resin | 52.8 | 52.8 | 52.8 | 52.8 |
| Defoamer | 0.1 | 0.1 | 0.1 | 0.1 |
| Surfactant | 0.1 | 0.1 | 0.1 | 0.1 |
| Wollastonite | 42.2 | 35.2 | 35.2 | 35.2 |
| Aluminum Trihydrate ($Al_2O_3 \cdot 3H_2O$) | — | 7 | 7 | 7 |
| Water | 4.8 | 4.8 | 4.8 | 4.8 |

TABLE 6

| | Supersize Formulations | | | |
|---|---|---|---|---|
| Component | C1 (wt %) | S9 (wt %) | S10 (wt %) | S11 (wt %) |
| PF Resin[1] | 23.0 | 23.0 | 23.0 | 23.0 |
| Defoamer[2] | 0.1 | 0.1 | 0.1 | 0.1 |
| Dispersant[3] | 1.7 | 1.7 | 1.7 | 1.7 |
| Liquid Plastic Colorant | 2.8 | 2.8 | 2.8 | 2.8 |
| Fumed Silica Powder[4] | 0.2 | 0.2 | 0.2 | 0.2 |
| Potassium Fluoroborate ($KBF_4$) | 64.5 | 57.5 | 57.5 | 57.5 |
| Aluminum Trihydrate ($Al_2O_3 \cdot 3H_2O$) | — | 7.0 | — | — |
| Organically Modified Clay[5] | — | — | 7.0 | — |
| Imide Powder[6] | — | — | — | 7.0 |
| Water | 7.7 | 7.7 | 7.7 | 7.7 |

[1]Prefere 80 5080A
[2]Name, Business
[3]Daxad 11
[4]Cab-o-sil
[5]Cloisite 30B
[6]Twaron poly 5011 powder The compositions C1 and S9-S11 were successfully used to construct coated abrasive belts.

Example 4: Abrasive Testing of Abrasive Belts

Abrasive performance testing of the coated abrasive belts prepared above in Examples 1-3 was conducted on carbon steel test workpieces; stainless steel test workpieces; and Inconel test workpieces according to the following test conditions.

Figure 4:
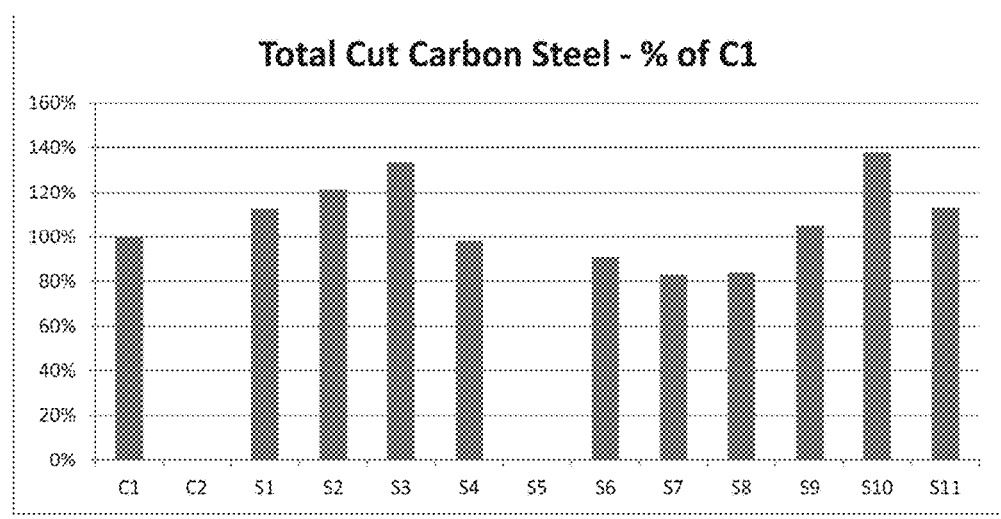
FIG. 4 is a graph showing cumulative material removed from a carbon steel substrate by inventive embodiments compared to a conventional coated abrasive article.

Carbon Steel Testing
Testing Method (Machine): Power Assist Plunge (fixed feed belt tester)
Test Workpiece: 4140 CD Steel
Workpiece Dimensions: 1"×1"×48"
Force: 450<psi avg. force end pt.
Product Speed: 5700 sfpm
Test Speed: 15"/min·infeed
Test results are shown in Table 7 in FIG. 4.

Figure 5:
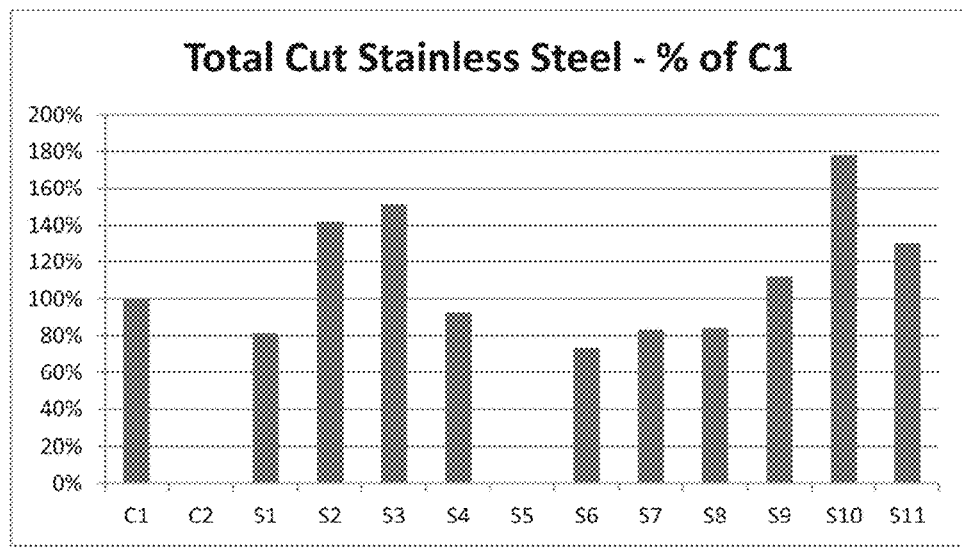
FIG. 5 is a graph showing cumulative material removed from a stainless steel substrate by inventive embodiments compared to a conventional coated abrasive article.
Figure 6:
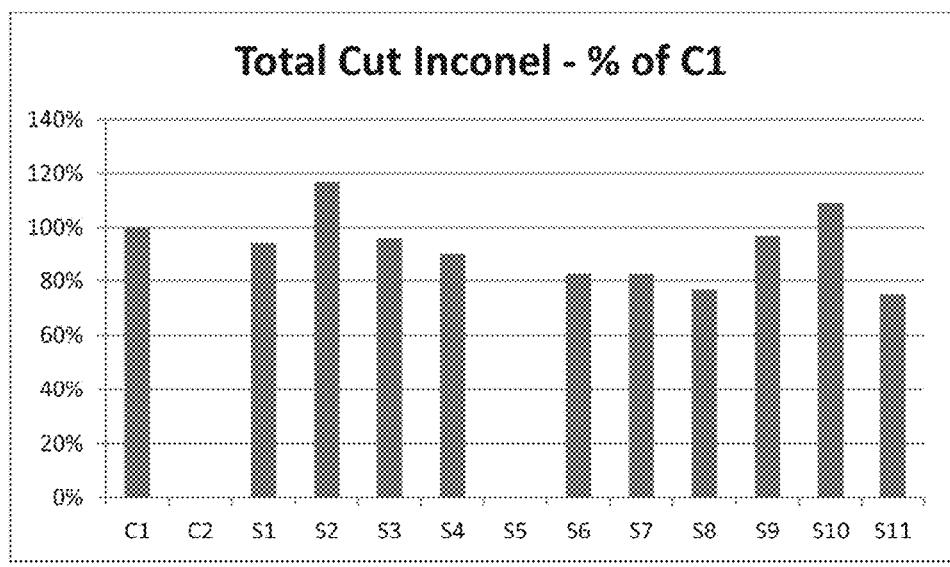
FIG. 6 is a graph showing cumulative material removed from an Inconel alloy substrate by inventive embodiments compared to a conventional coated abrasive article.

Stainless Steel Testing
  Testing Method (Machine): Power Assist Plunge (fixed feed belt tester)
  Test Workpiece: 304 Stainless Steel
  Workpiece Dimensions: 1"×1"×48"
  Force: 450<psi avg. force end pt.
  Product Speed: 5700 sfpm
  Test Speed: 15"/min·infeed
  Test results are shown in Table 7 and FIG. 5.
Inconel Testing
  Testing Method (Machine): Power Assist Plunge (fixed feed belt tester)
  Test Workpiece: 718 Inconel
  Workpiece Dimensions: 1.125" o.d.×48"
  Force: 450<psi avg. force end pt.
  Product Speed: 7500 sfpm
  Test Speed: 24"/min·infeed
  Test results are shown in Table 7 and FIG. 6.

TABLE 7

Abrasive Testing of Sample Abrasive Belts

| Sample | Make Coat | Size Coat | Supersize Coat | Total Cut Carbon Steel (% of C1) | Total Cut Stainless Steel (% of C1) | Total Cut Inconel (% of C1) |
|---|---|---|---|---|---|---|
| C1 | Control | Control | Control | 100 | 100 | 100 |
| C2 | Control | Control | 7% wt % Zinc Borate | — | — | — |
| S1 | Control | Control | 7% wt % Aluminum Trihydrate | 112 | 81 | 94 |
| S2 | Control | Control | 7% wt % Organically Modified Clay | 121 | 142 | 117 |
| S3 | Control | Control | 7% wt % Imide Powder | 133 | 151 | 96 |
| S4 | Control | Control | 15% wt % Aluminum Trihydrate | 98 | 92 | 90 |
| S5 | Control | Control | 15% wt % Imide Powder | — | — | — |
| S6 | Cloisite/Twaron 1:3 (7 wt %) | Control | Control | 91 | 73 | 83 |
| S7 | Cloisite/Twaron 1:1 (7 wt %) | Control | Control | 83 | 83 | 83 |
| S8 | Cloisite/Twaron 3:1 (7 wt %) | Control | Control | 84 | 84 | 77 |
| S9 | 7% wt % Aluminum Trihydrate | Control | 7% wt % Aluminum Trihydrate | 105 | 112 | 97 |
| S10 | 7% wt % Aluminum Trihydrate | Control | 7% wt % Organically Modified Clay | 138 | 178 | 109 |
| S11 | 7% wt % Aluminum Trihydrate | Control | 7% wt % Imide Powder | 113 | 130 | 75 |

Carbon Steel Testing Results

Regarding the results of the carbon steel testing, it was observed that the presence of alumina trihydrate (S1), organically treated clay (S2), and imide powder (S3) in the supersize coat provided unexpected and beneficial abrasive performance over the control abrasive belt. There were no active filler particles in the make coat or the size coat for these samples. Surprisingly, although 7 wt % of zinc borate (C2) was not usable in a supersize coat, 7 wt % of each of the active filler particles successfully produced increased abrasive performance compared to the control belt (C1). Alumina trihydrate in the size coat (S1) produced about 12% greater cumulative substrate removal than the control belt. Organically treated clay in the size coat (S2) produced about 21% greater cumulative substrate removal than the control belt. Imide powder in the size coat (S3) produced about 33% greater cumulative substrate removal than the control belt.

Surprisingly, it was observed that an excess of active filler particles in the size coat would produce less desirable abrasive performance. An amount of 15 wt % of alumina trihydrate (S5) was still usable in a size coat, but the abrasive performance was inferior to S1 and C1. As was mentioned previously above, an amount of 15 wt % of imide powder (S5) was unusable in a size coat.

Surprisingly, it was observed that the presence of organically modified clay and imide powder in a make coat (S6-S8), but no active filler particles in the size coat or supersize coat, produced abrasive performance inferior to the control belt. The results appear to indicate that the presence of active filler particles in the size coat is important to achieving beneficial performance.

Surprisingly, it was observed that a particular combination of active filler particles in the make coat and in the supersize coat produced beneficial abrasive performance. In particular, when alumina trihydrate was present in the make coat, and the active filler particles were also present in the size coat (S9-S11), beneficial abrasive performance was again achieved. However, the benefits of the combinations did vary. For instance, when alumina trihydrate was present in both the make coat and the supersize coat (S9), the performance was still superior (about 5% greater) to the control belt (C1), but inferior to alumina trihydrate alone in the supersize coat (S1). Similarly, when alumina trihydrate was present in the make coat and imide powder in the supersize coat (S11), the performance was still superior (about 13% greater) to the control belt (C1), but inferior to imide powder alone in the supersize coat (S1). But in contrast, most surprisingly, when alumina trihydrate was present in the make coat and organically modified clay was in the supersize coat (S10), the performance was superior to the control belt (C1) (about 38% greater), was superior to the organically modified clay alone in the supersize coat (S2), and was even superior to the imide powder alone in the supersize coat (S3).

Stainless Steel Testing Results

Regarding the results of the stainless steel testing, it was observed that the presence of alumina trihydrate alone in the supersize coat (S1) was less desirable, but that the presence of organically treated clay (S2), and imide powder (S3) in the supersize coat provided unexpected and beneficial abrasive performance over the control abrasive belt. There were no active filler particles in the make coat or the size coat for these samples. Organically treated clay in the size coat (S2) produced about 42% greater cumulative substrate removal than the control belt. Imide powder in the size coat (S3) produced about 51% greater cumulative substrate removal than the control belt.

It was observed that an excess of active filler particles in the size coat would produce less desirable abrasive performance. An amount of 15 wt % of alumina trihydrate (S5) had an abrasive performance inferior to the control belt (C1), but unlike with the carbon steel testing, produced slightly better performance than the 7 wt % of alumina trihydrate of sample belt 51. As was mentioned previously above, an amount of 15 wt % of imide powder (S5) was unusable in a size coat.

Surprisingly, it was observed that the presence of organically modified clay and imide powder in a make coat (S6-S8), but no active filler particles in the size coat or supersize coat, produced abrasive performance inferior to the control belt. The results appear to indicate that the presence of active filler particles in the size coat is important to achieving beneficial performance.

Surprisingly, it was observed that a particular combination of active filler particles in the make coat and in the supersize coat produced beneficial abrasive performance. In particular, when alumina trihydrate was present in the make coat, and the active filler particles were also present in the size coat (S9-S11), beneficial abrasive performance was again achieved. However, the benefits of the combinations did vary. For instance, when alumina trihydrate was present in both the make coat and the supersize coat (S9), the performance was superior to the control belt (C1) (about 12% greater) and to alumina trihydrate alone in the supersize (S1). Similarly, when alumina trihydrate was present in the make coat and imide powder in the supersize coat (S11), the performance was still superior to the control belt (C1) (about 30% greater), but inferior to imide powder alone in the supersize coat (S1). But in contrast, most surprisingly, when alumina trihydrate was present in the make coat and organically modified clay was in the supersize coat (S10), the performance was superior to the control belt (C1) (about 78% greater), superior to the organically modified clay alone in the supersize coat (S2), and even superior to the imide powder alone in the supersize coat (S3).

Inconel Testing Results

Regarding the results of the Inconel testing, it was observed that the presence of alumina trihydrate alone in the supersize coat (S1) and imide powder alone (S3) was less desirable, but that the presence of organically treated clay (S2) in the supersize coat provided unexpected and beneficial abrasive performance over the control abrasive belt. There were no active filler particles in the make coat or the size coat for these samples. Organically treated clay in the size coat (S2) produced about 17% greater cumulative substrate removal than the control belt.

It was observed that an excess of active filler particles in the size coat would produce less desirable abrasive performance. An amount of 15 wt % of alumina trihydrate (S5) had an abrasive performance inferior to the control belt (C1) and to sample belt 51. As was mentioned previously above, an amount of 15 wt % of imide powder (S5) was unusable in a size coat.

Surprisingly, it was observed that the presence of organically modified clay and imide powder in a make coat (S6-S8), but no active filler particles in the size coat or supersize coat, produced abrasive performance inferior to the control belt. The results appear to indicate that the presence of active filler particles in the size coat is important to achieving beneficial performance.

Surprisingly, it was observed that the particular combination of alumina trihydrate in the make coat and the other active filler particles in the size coat (S9-S11) was sometimes only sometimes beneficial and that the benefits of the combinations did vary. For instance, when alumina trihydrate was present in both the make coat and the supersize coat (S9), the performance was inferior to the control belt (C1). Similarly, when alumina trihydrate was present in the make coat and imide powder in the supersize coat (S11), the performance was inferior to the control belt (C1). But in contrast, when alumina trihydrate was present in the make coat and organically modified clay was in the supersize coat (S10), the performance was superior to the control belt (C1) (about 9% greater), but surprisingly was less than the organically modified clay alone in the supersize coat (S2).

In the foregoing, reference to specific embodiments and the connections of certain components is illustrative. It will be appreciated that reference to components as being coupled or connected is intended to disclose either direct connection between said components or indirect connection through one or more intervening components as will be appreciated to carry out the methods as discussed herein. As such, the above-disclosed subject matter is to be considered illustrative, and not restrictive, and the appended claims are intended to cover all such modifications, enhancements, and other embodiments, which fall within the true scope of the present invention. Moreover, not all of the activities described above in the general description or the examples are required, that a portion of a specific activity can not be required, and that one or more further activities can be performed in addition to those described. Still further, the order in which activities are listed is not necessarily the order in which they are performed.

The disclosure is submitted with the understanding that it will not be used to limit the scope or meaning of the claims. In addition, in the foregoing disclosure, certain features that are, for clarity, described herein in the context of separate embodiments, can also be provided in combination in a single embodiment. Conversely, various features that are, for brevity, described in the context of a single embodiment, can also be provided separately or in any subcombination. Still, inventive subject matter can be directed to less than all features of any of the disclosed embodiments.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, or essential feature of any or all the claims.

Thus, to the maximum extent allowed by law, the scope of the present invention is to be determined by the broadest permissible interpretation of the following claims and their equivalents, and shall not be restricted or limited by the foregoing detailed description.

What is claimed is:

1. Coated abrasive article comprising:
    a backing material;
    an abrasive layer disposed on the backing material, wherein the abrasive layer comprises abrasive particles disposed on or in a binder composition;
    a size coat layer disposed on the abrasive layer; and
    a supersize coat layer disposed on the size coat layer, wherein the supersize coat layer comprises
        a polymeric composition, and
        a plurality of active filler particles dispersed in the polymeric composition,
    wherein the active filler particles comprise alkyl quaternary ammonium bentonite particles, and
    wherein the active filler particles are present in an amount based on the weight of the supersize coat layer of not less than 0.1 weight percent and not greater than 15 weight percent.

2. The abrasive article of claim 1, wherein the active filler particles are present in an amount based on the weight of the supersize coat layer ranging from 3 wt % to 14 wt %.

3. The abrasive article of claim 1, wherein the organically modified clay particles have an average particle size of not greater than 50 microns and not less than 1 micron.

4. The abrasive article of claim 1, further comprising a plurality of alumina trihydrate particles dispersed in the binder composition of the abrasive layer.

5. The abrasive article of claim 4, wherein the alumina trihydrate particles are present in amount not greater than 15 weight % and not less than 0.1 wt %.

6. The abrasive article of claim 1, wherein the abrasive article has an increased cumulative carbon steel removal rating of at least 5% compared to an identical coated abrasive with the only difference being the plurality of active filler particles present in the supersize coat.

7. The abrasive article of claim 1, wherein the abrasive article has an increased cumulative stainless steel material removal rating of at least 5% compared to an identical coated abrasive with the only difference being the plurality of active filler particles present in the supersize coat.

8. The abrasive article of claim 1, wherein the abrasive article has an increased cumulative Inconel material removal rating of at least 5% compared to an identical coated abrasive with the only difference being the plurality of active filler particles present in the supersize coat.

9. The abrasive article of claim 1, wherein the active filler particles of the supersize coat consist essentially of alkyl quaternary ammonium bentonite particles.

10. A method of making a coated abrasive article comprising:
    disposing an abrasive layer on a backing;
    disposing a size coat layer on the abrasive layer;
    disposing a supersize coat layer on the size coat layer, wherein the supersize coat layer comprises a plurality of active filler particles dispersed in a polymeric composition,
    wherein the active filler particles comprise alkyl quaternary ammonium bentonite particles, and
    wherein the active filler particles are present in an amount based on the weight of the supersize coat layer of not less than 0.1 weight percent and not greater than 15 weight percent.

* * * * *